United States Patent
Songhori et al.

(10) Patent No.: US 12,488,164 B2
(45) Date of Patent: Dec. 2, 2025

(54) ALIGNMENT COST FOR INTEGRATED CIRCUIT PLACEMENT

(71) Applicant: Google LLC, Mountain View, CA (US)

(72) Inventors: Ebrahim Mohammadgholi Songhori, Sunnyvale, CA (US); Shen Wang, Sunnyvale, CA (US); Azalia Mirhoseini, Mountain View, CA (US); Anna Goldie, San Francisco, CA (US); Roger Carpenter, Novato, CA (US); Wenjie Jiang, Fremont, CA (US); Young-Joon Lee, Saratoga, CA (US); James Laudon, Madison, WI (US)

(73) Assignee: Google LLC, Mountain View, CA (US)

(*) Notice: Subject to any disclaimer, the term of this patent is extended or adjusted under 35 U.S.C. 154(b) by 668 days.

(21) Appl. No.: 17/890,370

(22) Filed: Aug. 18, 2022

(65) Prior Publication Data

US 2024/0095424 A1    Mar. 21, 2024

(51) Int. Cl.
*G06F 30/392* (2020.01)
*G06F 30/27* (2020.01)

(52) U.S. Cl.
CPC ............ *G06F 30/27* (2020.01); *G06F 30/392* (2020.01)

(58) Field of Classification Search
CPC .... G06F 16/2315; G06F 16/278; G06F 18/21; G06F 9/5066; G06F 30/398; G06F 30/392; G06F 18/23; G06F 16/285; G06F 16/211; G06F 30/27; G06F 30/12; G06F 30/13; G06F 30/18; G06F 30/20
USPC ................................................. 716/118–125
See application file for complete search history.

(56) References Cited

U.S. PATENT DOCUMENTS

| | | | |
|---|---|---|---|
| 7,904,840 B2 | 3/2011 | Tang | |
| 9,792,397 B1 | 10/2017 | Nagaraja | |
| 10,372,859 B2 | 8/2019 | Nagaraja | |
| 2010/0077374 A1 | 3/2010 | Qiu | |
| 2016/0091393 A1* | 3/2016 | Liao | G01M 13/00 702/34 |
| 2019/0147981 A1* | 5/2019 | van Rooyen | G16B 50/00 703/11 |
| 2021/0073449 A1* | 3/2021 | Segev | G06F 30/27 |

(Continued)

FOREIGN PATENT DOCUMENTS

WO    2021062219 A1    4/2021

OTHER PUBLICATIONS

Cheng et al. RePlAce: Advancing Solution Quality and Routability Validation in Global Placement. IEEE Transactions On Computer-Aided Design of Integrated Circuits and Systems, vol. 38, No. 9, Sep. 2019, pp. 1717-1730.

(Continued)

*Primary Examiner* — Binh C Tat
(74) *Attorney, Agent, or Firm* — Lerner David LLP

(57) ABSTRACT

Aspects of the disclosure are directed to automatically determining floor planning in chips, which factors in memory macro alignment. A deep reinforcement learning (RL) agent can be trained to determine optimal placements for the memory macros, where memory macro alignment can be included as a regularization cost to be added to the placement objective as a RL reward. Tradeoffs between the placement objective and alignment of macros can be controlled by a tunable alignment parameter.

20 Claims, 7 Drawing Sheets

(56) References Cited

U.S. PATENT DOCUMENTS

2021/0334445 A1 10/2021 Goldie et al.
2022/0108058 A1 4/2022 Goldie et al.

OTHER PUBLICATIONS

Lin et al. DREAMPlace: Deep Learning Toolkit-Enabled GPU Acceleration for Modern VLSI Placement. IEEE Transactions On Computer-Aided Design of Integrated Circuits and Systems, vol. 40, No. 4, Apr. 2021, pp. 748-761.

Mirhoseini et al. A graph placement methodology for fast chip design. Jun. 10, 2021. Nature, vol. 594. 23 pages.

Mirhoseini et al. Chip Placement with Deep Reinforcement Learning. Apr. 22, 2020. 15 pages.

Yan et al. Towards Machine Learning for Placement and Routing in Chip Design: a Methodological Overview. Feb. 28, 2022. 9 pages.

Yue et al. Scalability and Generalization of Circuit Training for Chip Floorplanning. Mar. 27-30, 2022. Session 4: Panel on Traditional Algorithms Versus Machine Learning Approaches ISPD '22, Mar. 27-30, 2022, Virtual Event, Canada. 6 pages.

International Search Report and Written Opinion for International Application No. PCT/US2023/019236 dated Jul. 17, 2023. 21 pages.

Kahng et al. RTL-MP: Toward Practical, Human-Quality Chip Planning and Macro Placement. Proceedings of the Genetic and Evolutionary Computation Conference, ACMPUB27, New York, NY, USA, Apr. 13, 2022 (Apr. 13, 2022), pp. 3-11.

Luk et al. Multistack Optimization For Data-Path Chip Layout. IEEE Transactions On Computer-Aided Design of Integrated Circuits and Systems, IEEE, USA, vol. 10, No. 1, Jan. 1, 1991 (Jan. 1, 1991), pp. 116-129.

\* cited by examiner

ALIGNMENT COST FOR INTEGRATED CIRCUIT PLACEMENT

BACKGROUND

Modern chip design is a complex and costly multi-year process. One of the most challenging and time consuming stages of chip design is floor planning. In floor planning, the location of memory macros in a 2D canvas of the chip blocks is determined. The objective of floor planning is to reduce power consumption and area while meeting design constraints, such as timing or design rules.

Automated chip floor planning tools can be used to find more efficient placements of memory macros. However, the resulting placements are not necessarily aligned. Non-aligned macros can cause difficulties in interpreting and debugging the placement for downstream tasks. Non-aligned macros can also violate assumptions made in building tools and processes of later stages of the chip design, such as routing.

BRIEF SUMMARY

Aspects of the disclosure are directed to automatically determining floor planning in chips that takes into account memory macro alignment. Floor planning can be automatically determined based on a Markov decision process (MDP). A deep reinforcement learning (RL) agent can be trained to determine optimal placements for the memory macros. Alignment can be included as a regularization cost to be added to the placement objective as a RL reward. Tradeoffs between the placement objective and alignment of macros can be controlled by a tunable alignment parameter. A placement proxy cost can be based on a weighted alignment cost.

An aspect of the disclosure provides for a method for automatically performing floor planning in a chip. The method includes identifying, with one or more processors, a first alignment parameter of nodes positioned on a surface of the chip; determining, with the one or more processors, a first reward based on the first alignment parameter; identifying, with the one or more processors, a second alignment parameter of the nodes on the surface of the chip, the second alignment parameter being identified based on the first reward; determining, with the one or more processors, a second reward based on the second alignment parameter; and selecting an alignment of nodes based on the second reward.

In an example, the method further includes iteratively identifying, with the one or more processors, additional alignment parameters of the nodes on the surface of the chip, the additional alignment parameters being identified based on a determined reward from a previous iteration. In another example, the method further includes iteratively determining, with the one or more processors, additional rewards based on the additional alignment parameters. In yet another example, the method further includes stopping, with the one or more processors, the iterative identifying and determining when the determined rewards approach a convergence or after a predetermined period of time.

In yet another example, the method further includes identifying, with the one or more processors, a density parameter and a congestion parameter of the nodes on the surface of the chip. In yet another example, the method further the first reward is determined further based on the density parameter and congestion parameter.

In yet another example, the determined first and second rewards are determined by a reward function that includes an alignment-based regularization cost. In yet another example, the alignment-based regularization cost is based on a reverse of a sum of all contiguous areas for the nodes normalized by the number of nodes. In yet another example, the second alignment parameter is identified to increase a likelihood that the second reward is greater than the first reward.

Another aspect of the disclosure provides for a system including one or more processors; and one or more storage devices coupled to the one or more processors and storing instructions that, when executed by the one or more processors, causes the one or more processors to perform operations for automatically performing floor planning in a chip. The operations include identifying a first alignment parameter of nodes positioned on a surface of the chip; determining a first reward based on the first alignment parameter; identifying a second alignment parameter of the nodes on the surface of the chip, the second alignment parameter being identified based on the first reward; determining a second reward based on the second alignment parameter; and selecting an alignment of nodes based on the second reward.

In an example, the operations further include iteratively identifying additional alignment parameters of the nodes on the surface of the chip, the additional alignment parameters being identified based on a determined reward from a previous iteration; iteratively determining additional rewards based on the additional alignment parameters; and stopping the iterative identifying and determining when the determined rewards approach a convergence or after a predetermined period of time.

In another example, the operations further include identifying a density parameter and a congestion parameter of the nodes on the surface of the chip, the first reward being determined further based on the density parameter and congestion parameter. In yet another example, the determined first and second rewards are determined by a reward function that includes an alignment-based regularization cost. In yet another example, the alignment-based regularization cost is based on a reverse of a sum of all contiguous areas for the nodes normalized by the number of nodes.

In yet another example, the second alignment parameter is identified to increase a likelihood that the second reward is greater than the first reward.

Yet another aspect of the disclosure provides for a non-transitory computer readable medium for storing instructions that, when executed by one or more processors, causes the one or more processors to perform operations for automatically performing floor planning in a chip. The the operations include identifying a first alignment parameter of nodes positioned on a surface of the chip; determining a first reward based on the first alignment parameter; identifying a second alignment parameter of the nodes on the surface of the chip, the second alignment parameter being identified based on the first reward; determining a second reward based on the second alignment parameter; and selecting an alignment of nodes based on the second reward.

In an example, the operations further include iteratively identifying additional alignment parameters of the nodes on the surface of the chip, the additional alignment parameters being identified based on a determined reward from a previous iteration; iteratively determining additional rewards based on the additional alignment parameters; and stopping the iterative identifying and determining when the determined rewards approach a convergence or after a predetermined period of time.

In another example, the operations further include identifying a density parameter and a congestion parameter of the nodes on the surface of the chip, the first reward being determined further based on the density parameter and congestion parameter. In yet another example, the determined first and second rewards are determined by a reward function that includes an alignment-based regularization cost, the alignment-based regularization cost being based on a reverse of a sum of all contiguous areas for the nodes normalized by the number of nodes.

In yet another example, the second alignment parameter is identified to increase a likelihood that the second reward is greater than the first reward.

DETAILED DESCRIPTION

Figure 1:
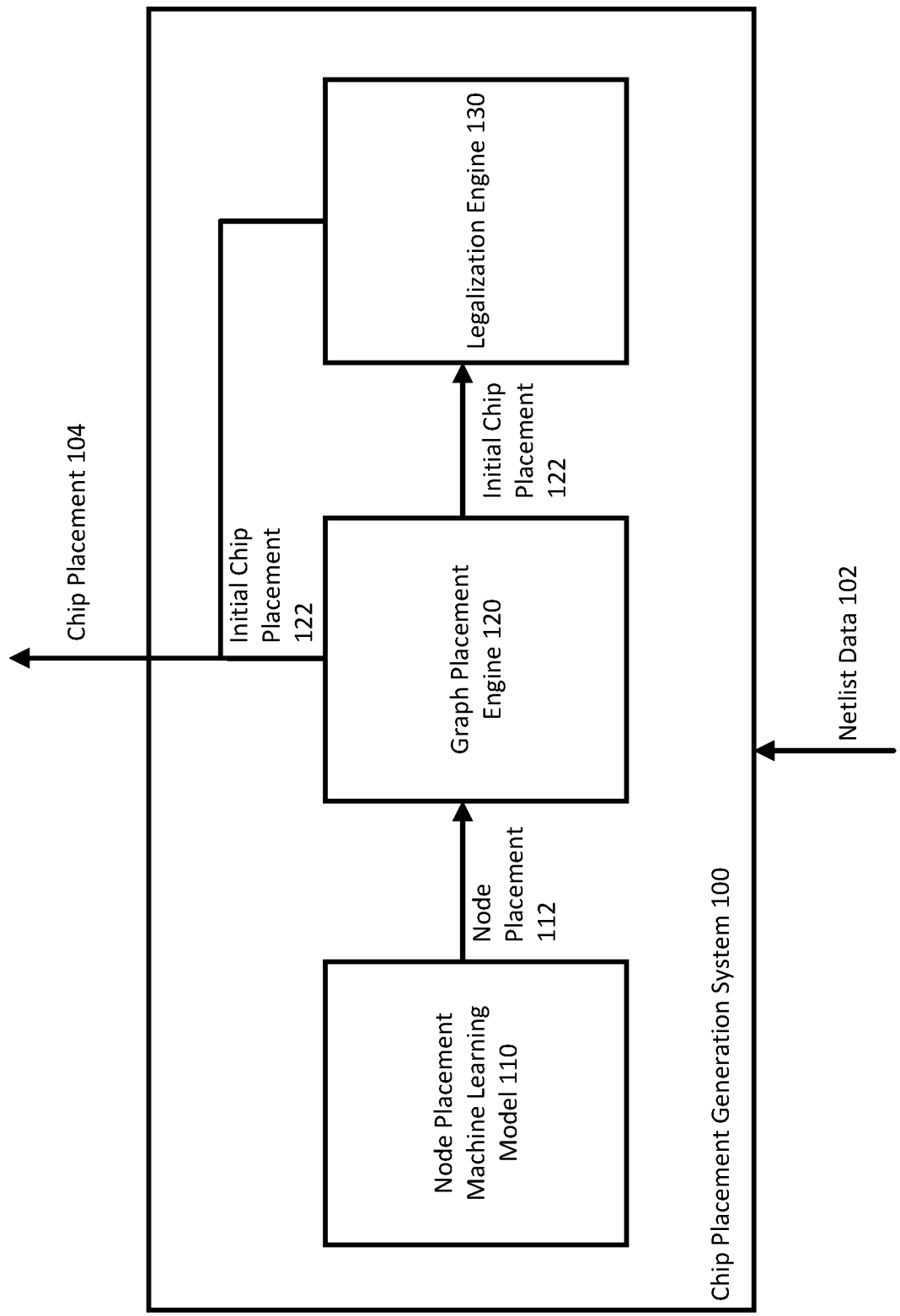
FIG. 1 depicts a block diagram of an example chip placement generation system according to aspects of the disclosure.

Generally disclosed herein are implementations for an alignment-cost based approach for automatically determining floor planning in computer chips. Floor planning involves determining locations for memory macros in a two-dimensional canvas of chip blocks. A placement objective for floor planning can include meeting design constraints, such as timing and design rules, and reducing power consumption and area.

Memory macros can correspond to blocks of integrated circuit components, such as static random access memory (SRAM) or other memory blocks, that are represented as a single node in a netlist. A netlist can correspond to a description of connectivity of an electronic circuit, such as a list of electronic components in a circuit and a list of nodes to which the electronic components are connected. For example, the nodes representing memory macros can include nodes that each represent a corresponding instance of an SRAM. As another example, the nodes representing memory macros can include hard macros that are made up of a fixed number of standard cells, such as a memory macro that is made up of a fixed number of instances of a register file. As yet another example, the nodes representing memory macros can include one or more nodes that each represent a phase-locked loop (PLL) circuit to be placed on the chip. As yet another example, the nodes representing memory macros can include one or more nodes that each represent a sensor to be placed on the chip.

Floor planning can be automatically determined based on a Markov decision process (MDP). A deep reinforcement learning (RL) agent can be trained to determine optimal placements for memory macros. Alignment can be included as a regularization cost to be added to the placement objective as a RL reward. Tradeoffs between the placement objective and alignment of macros can be controlled by a tunable alignment parameter. A placement proxy cost can be based on a weighted alignment cost.

The placement proxy cost can further be based on a weighted density cost and a weighted congestion cost, where density and congestion can be controlled by tunable parameters. The density cost can correspond to an average of a density violation, e.g., density above a density threshold. The density can be determined by counting a number of standard cells in a grid cell and dividing the number of standard cells by the area of the grid cell. Congestion cost can correspond to an average of horizontal and vertical congestion violations, e.g., routing violations. The congestion can be determined by a difference between available routing resources in a given region compared to an actual route that runs through the region.

Macros of the same or similar shape, e.g., macros with the same or similar weight and height, can be grouped together. If macros appear next to each other, either horizontally or vertically, then those macros can be considered as one contiguous area. Placement can be more packed and aligned if the contiguous area is larger. The cost of each contiguous area can be calculated as a reverse of its area. The cost for one macro group can be the sum of all contiguous areas normalized by the number of macros in the macro group. The overall cost can be the average of the cost for each macro group.

The agent can be rewarded when macros of the same or similar shape are packed together. A reward can correspond to a score equal to a negative of the placement proxy cost. Based on the reward, the parameters can be updated in order to maximize the reward or minimize the cost. When the rewards approach a convergence or a predetermined amount of time has occurred, the floor plan for the chip can be determined based on the converged reward or the maximum reward within the predetermined amount of time.

FIG. 1 depicts a block diagram of an example chip placement generation system 100. The chip placement generation system 100 can be implemented as one or more computer programs on one or more computers in one or more locations.

The system 100 is configured to receive netlist data 102 for a computer chip to be manufactured, such as a very large-scale integration (VLSI) chip like central processing units (CPUs) or hardware accelerators such as tensor processing units (TPUs) for machine learning acceleration. The computer chip can include a plurality of integrated circuit components, such as transistors, resistors, capacitors, etc., depending on the function of the chip. For example, the chip can be a special-purpose chip, such as an application-specific integrated circuit (ASIC) or a graphics processing unit (GPU), for machine learning computations, video processing, cryptography, or other compute-intensive functions.

The netlist data 102 corresponds to data describing the connectivity of the integrated circuit components of the computer chip. In particular, the netlist data 102 can specify a connectivity on the computer chip among a plurality of nodes that each correspond to one or more of a plurality of integrated circuit components of the computer chip. Each node can correspond to a respective non-overlapping proper subset of the integrated circuit components. For each of the plurality of nodes, the netlist data 102 can identify, which other nodes (if any) each node needs to be connected to by one or more wires in the manufactured computer chip. Each node in the netlist data 102 can also correspond to clusters of integrated circuit components.

The system 100 is configured to output a computer chip placement 104 that places some or all of the nodes in the netlist data 102 at a respective position on the surface of the computer chip. The outputted chip placement 104 can identify a respective position on the surface of the computer chip for some or all of the nodes in the netlist data 102 corresponding to the integrated circuit components represented by the nodes.

The system 100 can receive the netlist data 102 in any of a variety of ways. For example, the system 100 can receive the netlist data 102 as an upload from a remote user of the system over a data communication network, such as using an application programming interface (API) made available by the system 100. In some cases, the system 100 can then provide the outputted chip placement 104 to the remote user through the API provided by the system 100, such as for use in fabricating a chip according to the outputted chip placement 104. As another example, the system 100 can be part of an electronic design automation (EDA) software tool and can receive the netlist data 102 from a user of the tool or from another component of the tool.

The netlist data 102 can include nodes that represent macro components and nodes that represent standard cell components, as examples.

Macro components correspond to large blocks of IC components, e.g., static random-access memory (SRAM) or other memory blocks, that are represented as a single node in the netlist. For example, the nodes representing macro components can include nodes that each represent a corresponding instance of an SRAM. As another example, the nodes representing macro components can include hard macros that are made up of a fixed number of standard cells, such as a macro that is made up of a fixed number of instances of a register file. As yet another example, the nodes representing macro components can include one or more nodes that each represent a phase-locked loop (PLL) circuit to be placed on the chip. As yet another example, the nodes representing macro components can include one or more nodes that each represent a sensor to be placed on the chip.

Standard cell components correspond to a group of transistor and interconnect structures, such as a group that provides a Boolean logic function or a group that provides a storage function. Boolean logic functions can include AND, OR, XOR, XNOR, as examples. Storage functions can include flip-flop or latch, as examples. Nodes in the netlist data 102 can represent a single standard cell component or clustered standard cell components.

The chip placement 104 can assign each node to a grid square in an N×M grid overlaid over the surface of the chip, where N and M are integers. The values of N and M can be provided as inputs to the system or the system 100 can generate the values of N and M.

For example, the system 100 can treat choosing the optimal number of rows and columns as a bin-packing problem and can rank different combinations of rows and columns by the amount of wasted space they incur on the surface of the chip. The system 100 can then select the combination that results in the least amount of wasted space as the values for N and M.

As another example, the system 100 can process an input derived from the netlist data, an input characterizing the surface of the integrated circuit chip, or both inputs using a grid generation machine learning model that is configured to process the input(s) to generate an output that defines how to divide the surface of the integrated circuit chip into the N×M grid.

The system 100 can include a node placement machine learning model 110, a graph placement engine 120, and a legalization engine 130.

The node placement model 110 can correspond to a neural network that is configured to generate macro node placements 112. In particular, the macro node placement 112 can arrange each macro node in the netlist data 102 at a respective position on the surface of the computer chip.

The node placement model 110 can generate the macro node placement 112 by placing a respective macro node from the netlist data 102 at each time step in a sequence of a plurality of time steps. The node placement model 110 can generate the macro node placement 112 over a number of time steps, with one or more macro nodes being arranged during each consecutive time step according to a macro node order.

At each time step in the sequence, the node placement model 110 processes an input representation for the particular time step. The input representation for a particular time step can correspond to respective positions on the surface of the chip of any macro nodes that are before a particular macro node to be placed at the particular time step in the macro node order. The input representation can also correspond to the particular macro node to be placed at the particular time step. The input representation can further include data that characterizes the connectivity between the nodes that is specified in the netlist data 102. For example, the input representation may characterize, for some or all of the nodes, one or more other nodes to which that node is connected according to the netlist data 102. The input representation can represent each connection between any two nodes as an edge connecting the two nodes.

The node placement model 110 can be configured to process the input representation according to current values of parameters of the node placement model 110 to generate a score distribution over a plurality of positions on the surface of the computer chip. Parameters can include network parameters of a neural network, such as weights and biases of each neuron in the neural network. A score distribution can correspond to a probability distribution or a distribution of logits, as examples, and can be over the grid squares in the N×M grid overlaid over the surface of the chip.

In the first time step of the sequence, the input representation can indicate that no nodes have been placed. Therefore, each node in the netlist data 102 does not yet have a position on the surface of the chip. The node placement model 110 can then assign a macro node to be placed at a particular time step to a position from the plurality of positions using the score distribution. By adding macro nodes to the placement one by one, after the last time step in the sequence, the macro node placement 112 can include a respective placement for all of the macro nodes in the netlist data 102.

Once the node placement model 110 generates the macro node placement 112, the graph placement engine 120 generates an initial computer chip placement 122 by placing each of the standard cells of the netlist data 102 at a respective position on the surface of a partially placed integrated circuit chip. The partially placed integrated circuit chip can include the macro components represented by the macro nodes placed according to the macro node placement 112.

The graph placement engine 120 can cluster the standard cells into a set of standard cell clusters using, for example, a partitioning technique based on a normalized minimum cut objective, such as hMETIS, Fiduccia-Mattheyses (FM), or Kernighan-Lin (KL). The graph placement engine 120 can also obtain input data identifying already generated clusters. The graph placement engine 120 can then place each cluster of standard cells at a respective position on the surface of the partially placed integrated circuit chip using a graph placement technique. The graph placement engine 120 can also directly place each standard cell at a respective position on the surface of the partially placed integrated circuit chip using the graph placement technique, without clustering the standard cells.

The graph placement technique can be any appropriate technique for placing nodes of a graph. For example, the graph placement engine 120 can use a force based technique, such as a force-directed technique. When using a force based technique, the graph placement engine 120 represents the netlist data 102 as a system of springs that apply force to each node according to a weight×distance formula, causing tightly connected nodes to be attracted to one another. The graph placement engine 120 can also include a repulsive force between overlapping nodes to reduce placement density. After applying all forces, the graph placement engine 120 can move nodes in the direction of the force vector. To reduce oscillations, the graph placement engine 120 can set a maximum distance for each move. As another example, the graph placement engine 120 can use electromagnetic force fields to move nodes.

The system 100 can use the initial chip placement 122 as the outputted chip placement 104 or the system 100 can provide the initial chip placement 122 to the legalization engine 130 that adjusts the initial chip placement 122 to generate the outputted chip placement 104.

The legalization engine 130 can be configured to generate a legalized integrated circuit chip placement by applying a greedy legalization algorithm to the initial chip placement 122. For example, the legalization engine 130 can perform a greedy legalization step to snap macros onto the nearest legal position while honoring minimum spacing constraints.

The legalization engine 130 can further refine the legalized placement or can refine the initial chip placement 122 directly by performing simulated annealing on a reward function. For example, the legalization engine 150 can perform simulated annealing by applying a hill climbing algorithm to iteratively adjust the placements in the legalized placement or the initial chip placement 122 to generate the outputted computer chip placement 104. As another example, the system 100 further refine the legalized placement or can refine the initial chip placement 122 directly by providing the legalized placement or the initial placement 122 to an EDA software tool for evaluation and fine-tuning.

The system 100 or an external system can then fabricate a chip according to the outputted chip placement 104. The chip can exhibit improved performance, such as having lower power consumption, lower latency, and/or smaller surface area, and/or use fewer resources than one designed using a conventional design process. Fabricating the chip according to the outputted chip placement 104 can further include presenting data identifying the outputted chip placement 104 to a user to allow the user to modify the outputted chip placement 104 before fabrication or providing the outputted chip placement 104 to an EDA for fine-tuning before fabrication.

Figure 2:
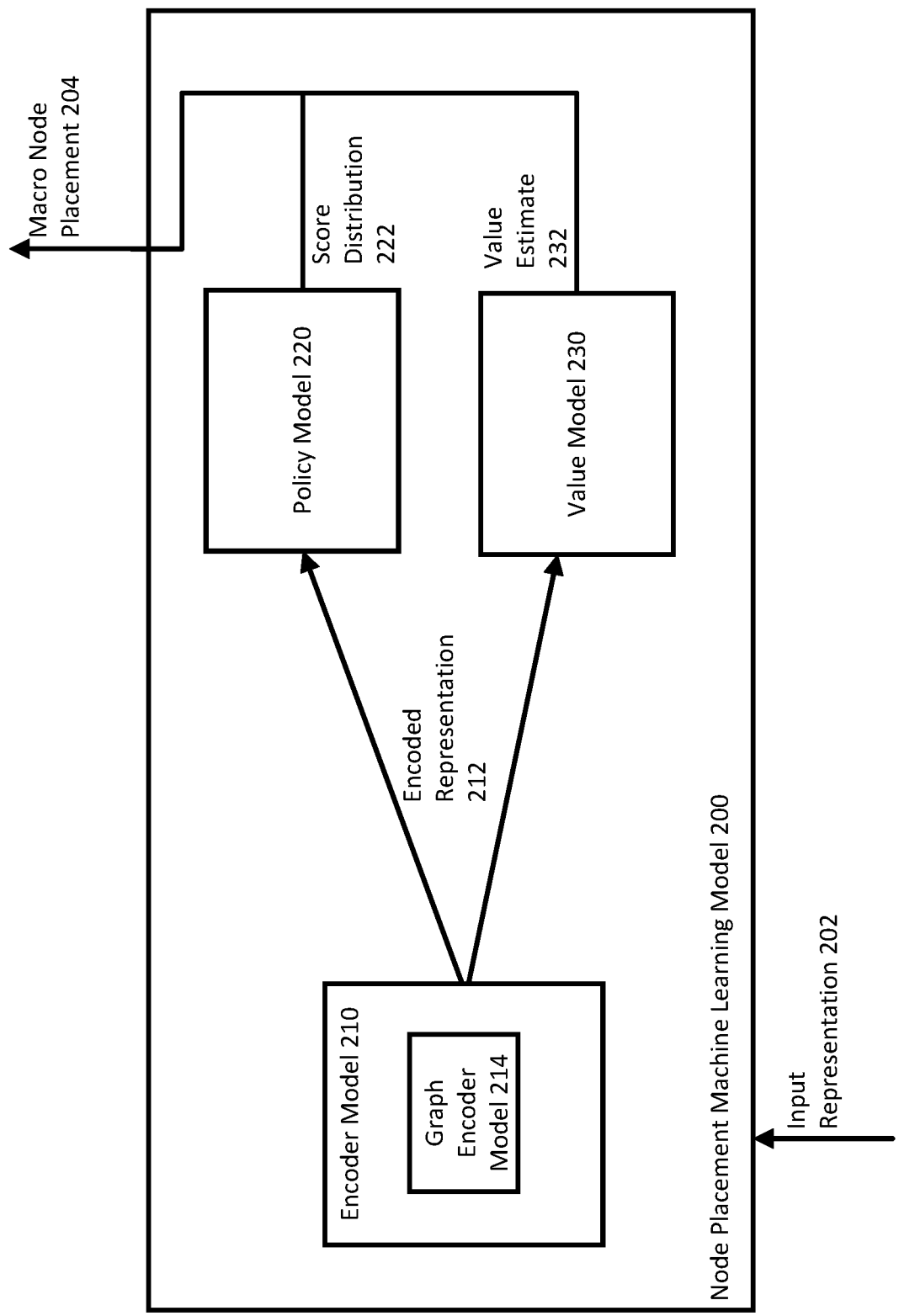
FIG. 2 depicts a block diagram of an example node placement model according to aspects of the disclosure.

FIG. 2 depicts a block diagram of an example node placement model 200. The node placement model can correspond to the node placement model 110 as depicted in FIG. 1. At each time step during generation of a macro node placement 204, the node placement model 200 is configured to receive an input representation 202 and to process the input representation to generate a score distribution over a plurality of locations on the surface of the computer chip. The input representation can include data characterizing respective positions on the surface of the chip of any macro nodes that are before a particular macro node to be placed at the particular time step in the macro node order and/or data characterizing the particular macro node to be placed at the particular time step.

The node placement model 210 can include an encoder model 210, a policy model 220, and a value model 230. Each model can correspond to a neural network, as an example.

At each time step, the encoder model 210 is configured to process the input representation 202 to generate an encoded representation 212 of the input representation. An encoded representation 212 can correspond to a numeric representation in a fixed dimensional space, such as an ordered collection of a fixed number of numeric values. For example, the encoded representation can be a vector or a matrix of floating point values or other type of numeric values.

At each time step, the policy model 220 is configured to process the encoded representation 212 to generate a score distribution 222. The policy model 220 can have any appropriate model architecture that allows the policy model 220 to map the encoded representation 212 to the score distribution 222. For example, the policy model 220 can correspond to a deconvolutional neural network that includes a fully-connected neural network followed by a set of de-convolutional layers. The policy model 220 can also include other types of neural network layers, such as batch normalization layers or other kinds of normalization layers. In other examples, the policy model 220 can correspond to a recurrent neural network that includes one or more recurrent neural network layers, such as long short-term memory (LSTM) layers, gated recurrent unit (GRU) layers, or other types of recurrent layers, and an output layer that generates the scores for the positions. For example, when the scores are probabilities, the output layer can be a softmax layer.

At each time step, the value model 230 is configured to process the encoded representation 212 to generate a value estimate 232 that estimates a value of a current state of the placement as of the particular time step. The value of the current state can correspond to an estimate of the output of a reward function for a placement that is generated starting from the current, partial placement. For example, the value model 230 can correspond to a recurrent neural network or a feedforward neural network. The value model 230 can correspond to a neural network that includes one or more fully-connected layers.

The value estimate 232 can be used during training of the node placement model 200, such as when using a reinforcement learning technique that relies on value estimates being available. When the reinforcement learning technique used to train the node placement model 200 requires a value estimate, the node placement model 200 should also include the value model 230. In other examples, the value model 230 can be omitted.

The input representation 202 can correspond to a feature representation that includes macro features, netlist graph data, and a current macro ID. Macro features can correspond to a respective vectorized representation of some or all of the nodes in the netlist data. Netlist graph data can represent the connectivity between nodes in the netlist data as edges that connect each two respective nodes in the netlist data. Current macro ID can identify the macro node being placed at a particular time step. For example, the input feature representation 202 can include a respective vectorized representation of only the macro nodes, of the macro nodes and the clusters of standard cells, or of the macro nodes and the standard cell nodes.

Each vectorized representation characterizes the corresponding node. For each node that has already been placed, the vectorized representation can include data identifying the position of the node on the surface of the chip, such as coordinates of the center of the node or of some other designated part of the node. For each node that has not already been placed, the vectorized representation can include data indicating that the node has not yet been placed, such as default coordinates that indicate the node has yet to be placed on the surface of the chip. The vectorized representation can also include other information that characterizes the node, such as the type of node and the dimensions of the node. The type of node can include macro nodes or standard cell nodes. Dimensions of the node can include height and width.

The encoder model 210 can include a graph encoder model 214 that processes the vectorized representations of the nodes in the netlist to generate a netlist embedding of the vectorized representations of the nodes in the netlist and a current node embedding that represents the macro nodes to be placed at a particular time step. An embedding can correspond to a numeric representation in a fixed dimensional space, such as an ordered collection of a fixed number of numeric values. For example, the embedding can be a vector or a matrix of floating point values or other type of numeric values.

The graph encoder model 214 can initialize a respective edge embedding for each edge in the netlist data and initialize a respective node embedding for each node in the netlist data. The edge embeddings can be initialized randomly, and the node embeddings can be initialized such that the node embedding can be equal to the respective vectorized representation for the node. The graph encoder model 214 then can repeatedly update the node and edge embeddings by updating the embeddings at each of a plurality of message passing iterations. The graph encoder model 214 can use any of a variety of message passing techniques to update the node and edge embeddings at each message passing iteration. For example, node embeddings can be updated using an average of the edge embeddings that are corresponding to the connecting edges.

At each message passing iteration, the graph encoder model 214 can update the edge embedding for each edge using the respective node embeddings for the two nodes connected by the edge. To update the embedding for a given edge, the graph encoder model 214 can generate an aggregated representation from at least the node embeddings for the two nodes connected by the edge and can process the aggregated representation using a first fully-connected neural network to generate the updated edge embedding for the given edge. Each edge can have the same weight, such as one, in the netlist data, or each edge can be associated with a respective weight in the netlist data. The graph encoder model 214 can generate the aggregated representation from the node embeddings for the two nodes connected by the edge and the weight associated with the edge in the netlist data. The weights for each edge can be learned jointly with the training of the node placement model 200.

To update the embedding for a given node at a given message passing iteration, the graph encoder model 214 can update the node embedding for the node using the respective edge embeddings for the edges that are connected to the node. For example, the system can average the respective edge embeddings for the edges that are connected to the node.

After the last message passing iteration, the graph encoder model 214 can generate the netlist embedding and the current node embedding from the node and edge embeddings. For example, graph encoder model 214 can generate the netlist embedding by combining the edge embeddings after the last message passing iteration. As another example, the graph encoder model 214 can compute the netlist embedding by applying a reduce mean function on the edge embeddings after the last message passing iteration. As yet another example, the graph encoder model 214 can set the current node embedding for the current node to be equal to the embedding for the current node after the last message passing iteration.

The input feature representation 202 can also include netlist metadata that characterizes the netlist of nodes. The netlist metadata can include any appropriate information that characterizes the netlist, such as information about the underlying semiconductor technology, including horizontal and vertical routing capacity, a total number of edges, macros, and standard cell clusters in the netlist, a canvas size, including a size of the surface of the chip, and/or a number of rows and columns in the grid. When the input feature representation includes netlist metadata, the encoder model 210 can include a fully-connected neural network that processes the metadata to generate a netlist metadata embedding.

The encoder model 210 can generate the encoded representation 212 from at least the netlist embedding of the vectorized representations of the nodes in the netlist and the current node embedding that represents the macro node to be placed at the particular time step. When the encoder neural network 210 also generates a netlist metadata embedding, the encoder model 210 can also use the netlist metadata embedding to generate the encoded representation 212. For example, the encoder model 210 can concatenate the netlist embedding, the current node embedding, and the netlist metadata embedding and then process the concatenation using a fully-connected neural network to generate the encoded representation 212.

The node placement model 200 tracks the alignment of the positions on the chip, such as of the squares in the grid. Alignment can correspond to nodes of the same or similar shape, such as macros with the same or similar weight and height, being grouped together. If nodes appear next to each other, either horizontally or vertically, then those nodes can be considered as one contiguous area. Placement can be more packed and aligned if the contiguous area is larger.

Figure 3:
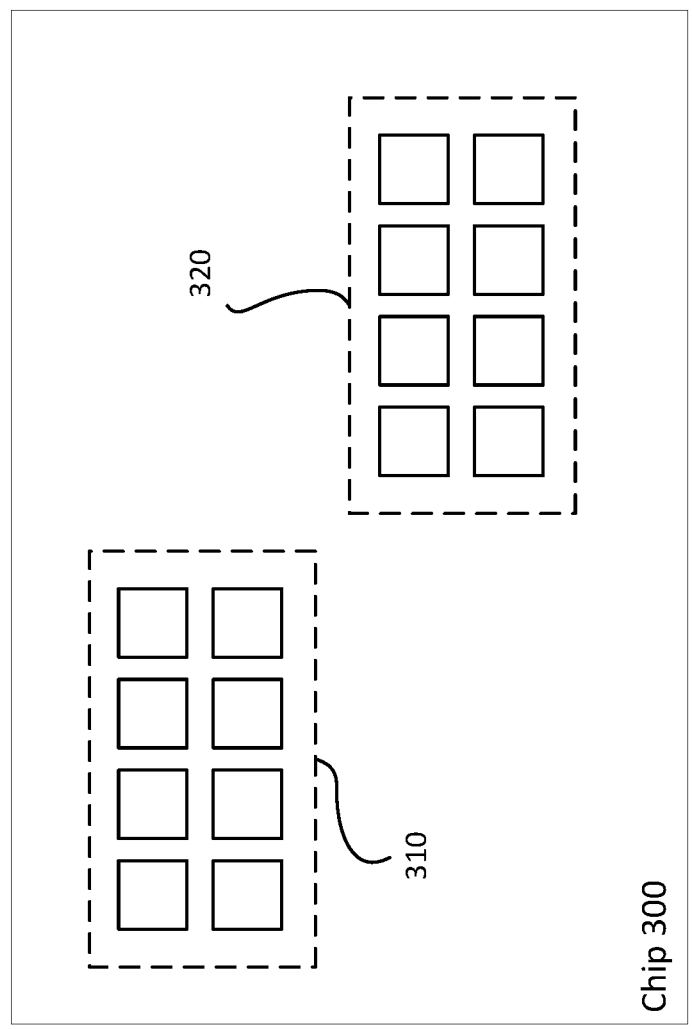
FIG. 3 depicts a block diagram of an example chip with two aligned groups of nodes according to aspects of the disclosure.
Figure 4:
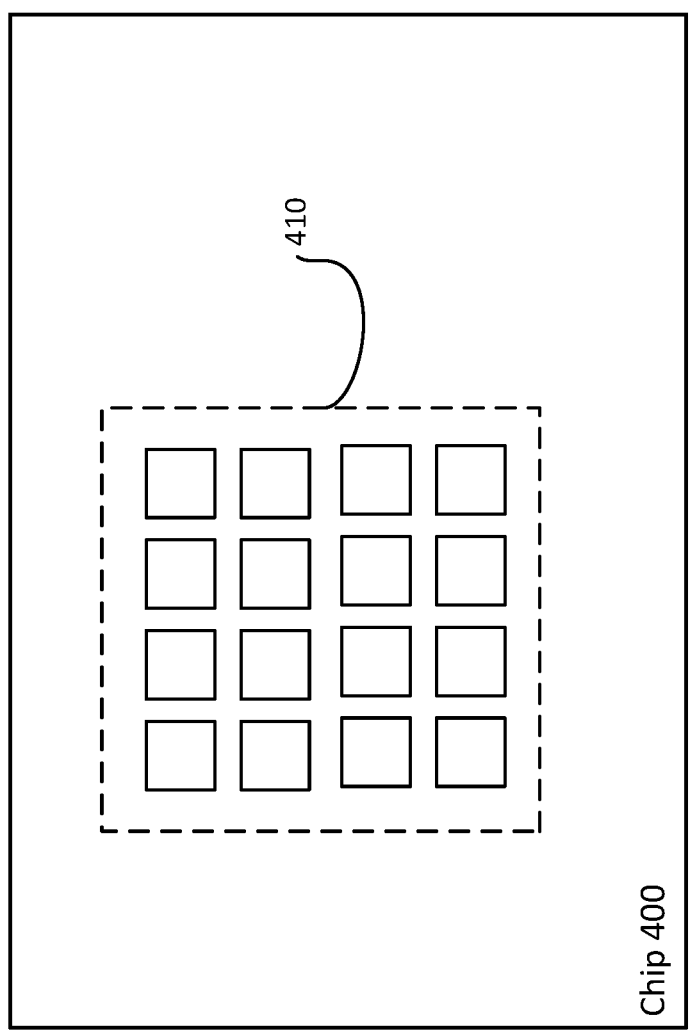
FIG. 4 depicts a block diagram of an example chip with an aligned group of nodes according to aspects of the disclosure.

FIG. 3 depicts a block diagram of an example chip 300 with aligned groups of nodes 310 and 320, but the nodes in group 310 are not aligned with the nodes in group 320. FIG. 4 depicts a block diagram of an example chip 400 with an aligned group of nodes 410. The example chip 400 depicted in FIG. 4 is more aligned than the example chip 300 depicted in FIG. 3 because the contiguous area of the aligned group of nodes 410 is larger than either groups of nodes 310 or 320.

The node placement model 200 can also track the density of the positions on the chip. The node placement model 200 can maintain a density value for each position that indicates the degree to which that position is occupied. When a node has been placed at a given position, the density value for that position is set equal to one, or to a different maximum value that indicates that the position is fully occupied. When no node has been placed at the given position, the density value for that position indicates the number of edges that pass through the position. The density value for a given position can also reflect blockages, such as clock straps or other structures that block certain parts of the chip surface, by setting the values for those positions to one.

The node placement model 200 can further track the congestion of the positions on the chip. The node placement model 200 can maintain a congestion value for each position that indicates the available routing resources for that position. Congestion can be determined by a difference between available routing resources in a given position compared to an actual route that runs through the position. For example, the congestion can correspond to the ratio of the wires that run through a region in a placement to the available wiring resources, such as a maximum number of wires which can run though that region. As another example, the congestion can correspond to the density of wires across the horizontal and vertical edges of the surface.

Once the policy model 220 has generated the score distribution 222 at the time step, the placement model 200 can use the alignment, density, and/or congestion to generate a modified score distribution and then assign the node corresponding to the time step using the modified score distribution. The placement model 200 can modify the score distribution by setting the score for any position that has an alignment, density, and/or congestion value that satisfies a threshold to zero. For example, node placement model 200 can assign the node to the position having the highest score in the modified score distribution or sample a position from the modified score distribution, such that each position has a likelihood of being selected, and then assign the node to the sampled position.

A grid alignment mask, grid density mask, and/or grid congestion mask can be applied to the score distribution 222 to generate the modified score distribution. For example, the grid alignment mask can assign the value for any position that has an alignment that is above a threshold to be zero and the value for any position that has an alignment not above the threshold to be 1. As another example, the grid density mask can assign the value for any position that has a density that is above the threshold to be zero and the value for any position that has a density that is not above the threshold to be one. As yet another example, the grid congestion mask can assign the value for any position that has a congestion that is above a threshold to be zero and the value for any position that has a congestion that is not above the threshold to be 1.

For the node placement model 110 to generate high quality placements, the system 100 or another system trains the node placement model 110 on training data. The system 100 can train the node placement model 110 using reinforcement learning to maximize expected rewards received as measured by a reward function. The reward function generally measures a quality of the placements generated using the node placement model 110. However, training the node placement model 110 only through reinforcement learning may result in poor generalization to new netlist data and the system 100 may therefore have to re-train the node placement model 110 from scratch each time a new netlist is received. To improve the generalization of the node placement model 110, the system 100 can train the encoder neural network 210 through supervised learning and then train the policy neural network 220 through reinforcement learning.

Figure 5:
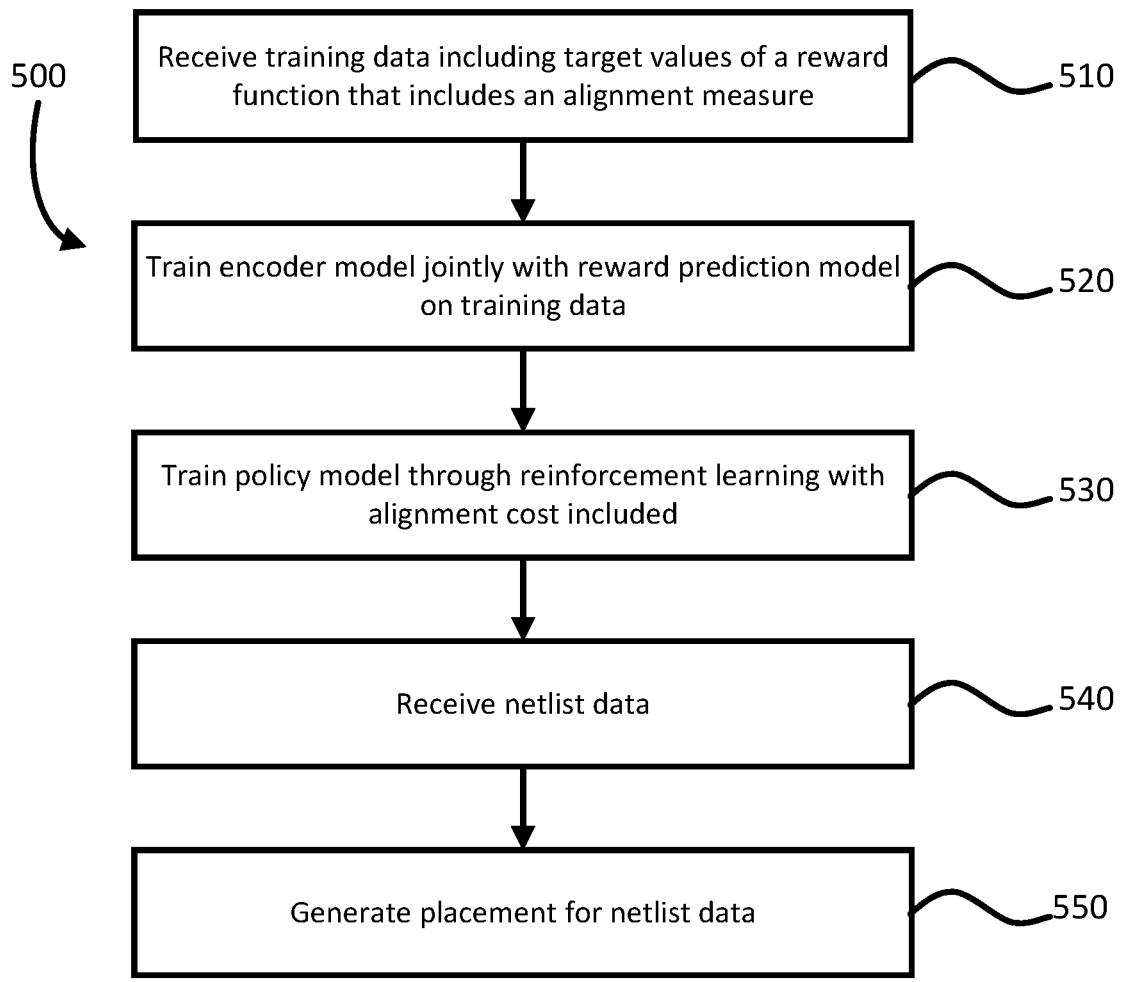
FIG. 5 depicts a flow diagram of an example process for training a node placement model according to aspects of the disclosure.

FIG. 5 depicts a flow diagram of an example process 500 for training a node placement model, such as node placement model 110 as depicted in FIG. 1 or node placement model 200 as depicted in FIG. 2. The process 500 can be performed by a system of one or more processors located in one or more locations. For example, a placement generation system, such as the placement generation system 100 as depicted in FIG. 1, can perform the process 500. The system can perform the process 500 to train the node placement model to determine trained values of network parameters.

The system can distribute the training of the node placement model across many different workers, which can include many different homogenous or heterogeneous computing devices that perform training computations using CPUs, GPUs, and/or ASICs. Some or all of the steps in the process 500 can be performed in parallel by many different workers operating asynchronously from one another in order to speed up the training of the node placement model. The different workers can also operate synchronously to perform some or all of the steps of the process 500 in parallel in order to speed up the training of the node placement model.

As shown in block 510, the system receives supervised training data. The supervised training data can include a plurality of training input representations, where each training input representation represents a respective placement of a respective netlist of nodes. The supervised training data can also include, for each training input representation, a respective target value of a reward function that measures a quality of the placement of the respective netlist of nodes.

The reward function can measure characteristics of the generated placements that, when optimized, result in a chip exhibiting good performance based on power consumption, heat generation, and/or timing performance, as examples. The reward function can include a respective term for one or more characteristics. When there are multiple terms, the reward function can be a sum or a weighted sum of the multiple terms.

The reward function can include an alignment measure that can be higher when nodes of the same or similar shape are packed together. Nodes of the same or similar shape, such as macros with the same or similar weight and height, can be grouped together. If nodes appear next to each other, either horizontally or vertically, then those nodes can be considered as one contiguous area. Placement can be more packed and aligned if the contiguous area is larger. The cost of each contiguous area can be calculated as a reverse of its area. The cost for one node group can be the sum of all contiguous areas normalized by the number of nodes in the node group. The overall cost can be the average of the cost for each node group. The overall alignment can correspond to a negative of the overall cost.

The reward function can include a wire length measure that can be higher when the wire length between nodes on the surface of the chip is shorter. For example, the wire length can be the negative of the Manhattan distance, such as a sum of absolute difference between the measures in all dimensions of two points, or other distance measure between all of the adjacent nodes on the surface of the chip. As another example, the wire length measure can be based on half-perimeter wirelength (HPWL), which approximates the wire length using the half-perimeter of the bounding boxes for all nodes in the netlist. When computing the HPWL, the system can assume that all wires leaving a standard cell cluster originate at the center of the cluster. The system can compute the HPWL for each edge in the netlist and then compute the wire length measure as equal to the negative of a normalized sum of the HPWLs for all of the edges in the netlist. Including a term that measures the wire length in the reward function has the advantage that write length roughly measures wiring cost and also correlates with other important metrics, such as power and timing.

The reward function can further include a congestion measure that is higher when congestion on the surface of the chip is lower. Congestion can correspond to a difference between available routing resources in a given region on the chip compared to actual routing resources that run through the region. The given region does not necessarily need to be a contiguous region. For example, the congestion measure can correspond to the ratio of the wires that run through the given region in a placement to the available wiring resources, such as a maximum number of wires which can run though that region. The congestion measure can be calculated by determining the ratio of available wiring resources in a placement compared to wiring estimates from a routing model for the netlist for each position on the surface. The routing model can include a net bounding box, routing topology, search algorithm, minimum spanning tree, and/or actual routed net, as examples. As another example, the congestion measure can correspond to density of wires across the horizontal and vertical edges of the surface. The congestion measure can be calculated by tracking vertical and horizontal allocations at each position separately, where the congestion measure can correspond to the negative of the average of a top percentage of congestion estimates, such as top 10%, 15%, or 20%. The congestion can be smoothed by running a convolutional filter in both the vertical and horizontal direction. The convolutional filter can depend on the number of positions in each direction, such as a 5×1 convolutional filter.

The reward function can also include a timing term, measuring timing of digital logic, that is higher when performance of the chip is better. For example, the reward function takes a correspondingly higher value for placements in the chip that allow for less time to perform computational tasks. Timing or performance of a placement can be measured using static timing analysis (STA). This measurement can include calculating stage delays over logic paths, including internal cell delays and wire delays, and finding critical paths that would determine the maximum speed a clock can run for safe operation. For a realistic view of timing, logic optimization may be necessary to accommodate paths getting longer or shorter as node placements are in progress.

There can be implicit tradeoffs between the alignment measure of the reward function and the other terms of the reward function. The tradeoff can be tuned by changing a weight associated with each reward function term. For example, a higher weight for alignment can correspond to placing greater emphasis on alignment over wirelength, density, congestion, and/or timing.

The system can receive the supervised training data from another system, or the system can generate the supervised training data itself. For example, the placements represented by the plurality of training input representations can be generated based on outputs of a different node placement model, such as a node placement neural network that has a simpler architecture than the one depicted in FIG. 2, at different time points during the training of the different node placement model on different netlists. This can ensure that the placements are of varying quality. As another example, the system can generate the supervised training data by selecting a set of different accelerator netlists and then generating placements for each netlist. To generate diverse placements for each netlist, the system can train a simpler policy model at various congestion weights, ranging from 0 to 1, and random seeds on the netlist data, such as through reinforcement learning, and collect snapshots of each placement during the course of policy training. Each snapshot can include a representation of the placement and the reward value generated by the reward function for the placement. An untrained policy model can start with random weights and the generated placements are of low quality, but as the policy model trains, the quality of generated placements can improve, allowing the system to collect a diverse dataset with placements of varying quality.

The training input representations can all represent finalized placements, such as one with all of the macro nodes in the corresponding netlist placed, or the training input representations can represent placements at various stages of the placement generation process. For example, some representations can represent partial placements where only some of the macro nodes have been placed.

As shown in block 520, the system trains the encoder model jointly with a reward prediction model on the supervised training data through supervised learning. The reward prediction model can correspond to a neural network configured to generate a predicted value of the reward function for the placement represented by the training input representation. The reward prediction model can generate a predicted value of the reward function for each training encoder input based on a received encoder output generated by the encoder model from the training input representation. For example, the reward prediction model can correspond to a fully-connected neural network that receives the encoder output and processes the encoder output to generate the reward prediction. When the encoder model has the architecture as depicted in FIG. 2, the encoder output can be a concatenation of the netlist graph embedding and the metadata embedding.

The system can train the encoder model and the reward prediction model to optimize an objective function, such as a mean squared error loss, that measures, for a given training representation, an error between the target value of the reward function and the predicted value of the reward function for the training input representation.

As shown in block 530, the system trains the policy model through reinforcement learning to generate score distributions that result in placements that maximize the reward function. With respect to alignment, the system can be rewarded when macro nodes of the same or similar shape are packed together. A reward can correspond to a score equal to a negative of a placement cost that can include parameters for alignment as well as wire length, density, congestion, and/or timing. Based on the reward, the parameters can be updated in order to maximize the reward or minimize the cost. When the rewards approach a convergence or a predetermined amount of time has occurred, the policy model can be trained based on the converged reward or the maximum reward within the predetermined amount of time.

The system can use any of a variety of reinforcement learning techniques to train the policy model. For example, the system can use a policy gradient technique, such as REINFORCE or Proximal Policy Optimization (PPO), for the training. In these cases, when the node placement model includes the value prediction model, the value prediction generated by the value model can be used to compute the baseline value that modifies the reward function value when computing the gradient of the reinforcement learning loss function.

While training the policy model through reinforcement learning, the system can hold the values of parameters of the encoder model fixed to the values determined through the training on the supervised training data. While training the policy model through reinforcement learning on a given netlist for a given chip, the system can use the placement model to place the macro nodes in the given netlist one-by-one, as described above. After the macro nodes have been placed, the system can place the standard cell nodes as described above to determine a final placement. The system can then compute the reward function for the final placement, such as by computing the required quantities described above, and use the reward value, the macro node placements, and the score distributions generated by the placement model to train the placement model through reinforcement learning. Thus, while the placement model can be only used to place the macro nodes, the reward values are computed only after the standard cell nodes have also been placed, ensuring that the placement model generates macro node placements that still allow for high quality placements of standard cell nodes.

As shown in block 540, the system receives new netlist data. As shown in block 550, the system can generate an integrated circuit placement for the new netlist data using the trained node placement model, such as by placing a respective node from the new netlist data at each of a plurality of time steps using score distributions generated by the trained node placement model.

The system can generate the placement for the new netlist data without training the node placement model any further. By training the encoder model through supervised learning and then training the policy model through reinforcement learning, the system trains the node placement model to generalize to new netlists without any additional training.

To further improve the quality of the placement that is generated for the new netlist, the system can first fine-tune the trained node placement model on the new netlist data through additional reinforcement learning and then generate an integrated circuit placement for the new netlist data using the fine-tuned node placement model. The system can use the same reinforcement learning technique described above during the fine-tuning and, depending on the implementation, can either hold the parameter values of the encoder model fixed or update the parameter values of the encoder model during this fine-tuning.

Figure 6:
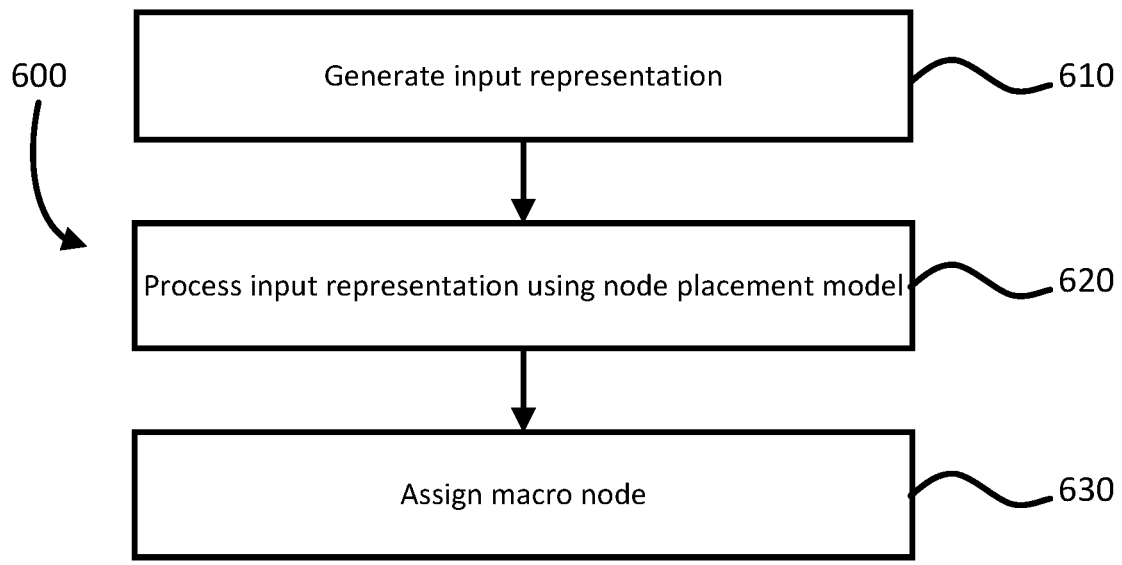
FIG. 6 depicts a flow diagram of an example process for placing a macro node at a given time step according to aspects of the disclosure.

FIG. 6 depicts a flow diagram of an example process 600 for placing a macro node at a given time step. The process 600 can be performed by a system of one or more processors located in one or more locations. For example, a placement generation system, such as the placement generation system 100 as depicted in FIG. 1, can perform the process 600. The system can perform the process 600 for each time step in the sequence of time steps to place each macro node according to the macro node order.

The system can receive the macro node order as an input along with the netlist data or the system can generate the macro node order from the netlist data. For example, the system can order the macro nodes according to size, such as by descending size, and break ties using a topological sort. By placing larger macros first, the system reduces the chance of there being no feasible placement for a later macro. The topological sort can help the policy model learn to place connected nodes close to one another. As another example, the system can process an input derived from the netlist data through a macro node order prediction machine learning model that is configured to generate an output that define the macro node order. As yet another example, the node placement model can be further configured to generate a probability distribution over the macro nodes. Then, the system can generate the macro node order dynamically by, for each particular time step in the plurality of time steps, selecting the macro node to be placed at the next time step after the particular time step based on the probability distribution over the macro nodes. For example, the system can select the macro node that has yet to be placed that has the highest probability.

As shown in block 610, form the netlist data, the system generates an input representation that characterizes respective positions on the surface of the chip of any macro nodes that are before a particular macro node to be placed at the given time step in the macro node order and the particular macro node to be placed at the given time step. The input representation can also include other information about the nodes in the netlist, netlist metadata, or both.

As shown in block 620, the system processes the input representation using a node placement model having a plurality of parameters. The node placement model can be configured to process the input representation in accordance with current values of the parameters to generate a score distribution over a plurality of positions on the surface of the integrated circuit chip. The parameters can include a tunable alignment parameter to control tradeoffs between a placement objective and an alignment of macros.

As shown in block 630, the system assigns the macro node to be placed at the particular time step to a position from the plurality of positions using the score distribution to place macros such that they are more aligned. The system can modify the score distribution based on the tracked alignment, tracked density, and/or tracked congestion of the current placement, such as by setting the scores for any positions that have a density value that satisfies a threshold value to zero, and then select a position from the modified score distribution.

The node placement model can be trained on multiple different placements for multiple different netlists for multiple different chips. This can require the node placement model to generate score distributions over differently sized chip surfaces. That is, when the plurality of positions are grid squares from an N×M grid overlaid over the surface of the integrated circuit chip, different chips can have different values for N and M. To account for this, the system can configure the neural network to generate scores over a fixed size maxN×maxM grid. When the value of N for the current chip is less than maxN, the system can set to zero the scores for the extra rows. Similarly, when the value of M for the current chip is less than maxM, the system can set to zero the scores for the extra columns.

Figure 7:
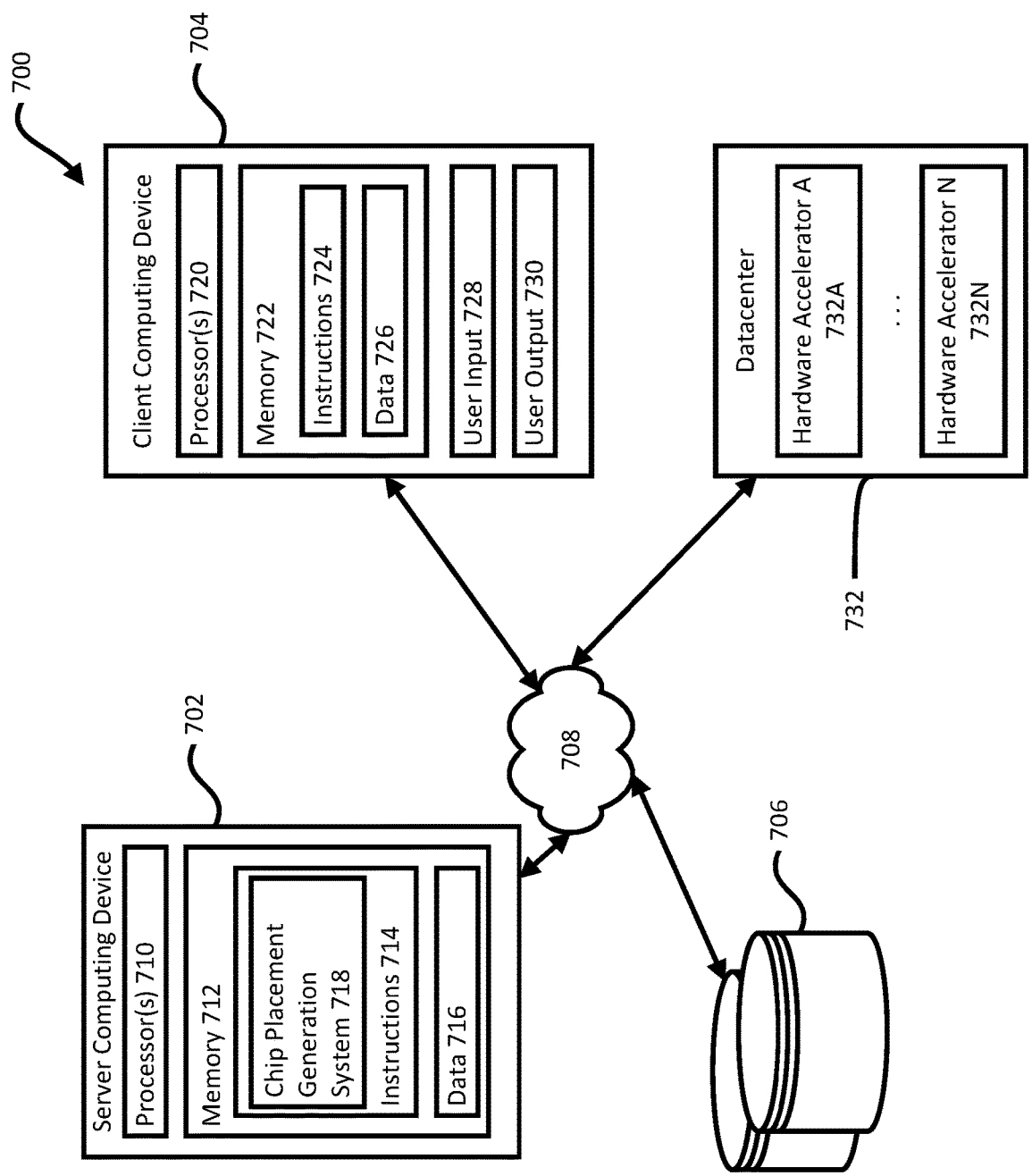
FIG. 7 depicts a block diagram of an example environment for implementing a chip placement generation system according to aspects of the disclosure.

FIG. 7 depicts a block diagram of an example environment 700 for implementing a chip placement generation system. The system 700 can be implemented on one or more devices having one or more processors in one or more locations, such as in server computing device 702. Client computing device 704 and the server computing device 702 can be communicatively coupled to one or more storage devices 706 over a network 708. The storage devices 706 can be a combination of volatile and non-volatile memory and can be at the same or different physical locations than the computing devices 702, 704. For example, the storage devices 706 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 702 can include one or more processors 710 and memory 712. The memory 712 can store information accessible by the processors 710, including instructions 714 that can be executed by the processors 710. The memory 712 can also include data 716 that can be retrieved, manipulated, or stored by the processors 710. The memory 712 can be a type of non-transitory computer readable medium capable of storing information accessible by the processors 710, such as volatile and non-volatile memory. The processors 710 can include one or more central processing units (CPUs), graphic processing units (GPUs), field-programmable gate arrays (FPGAs), and/or application-specific integrated circuits (ASICs), such as tensor processing units (TPUs).

The instructions 714 can include one or more instructions that when executed by the processors 710, causes the one or more processors to perform actions defined by the instructions. The instructions 714 can be stored in object code format for direct processing by the processors 710, or in other formats including interpretable scripts or collections of independent source code modules that are interpreted on demand or compiled in advance. The instructions 714 can include instructions for implementing a chip placement generation system 718, which can correspond to the chip placement generation system 100 of FIG. 1. The chip placement generation system 718 can be executed using the processors 710, and/or using other processors remotely located from the server computing device 702.

The data 716 can be retrieved, stored, or modified by the processors 710 in accordance with the instructions 714. The data 716 can be stored in computer registers, in a relational or non-relational database as a table having a plurality of different fields and records, or as JSON, YAML, proto, or XML documents. The data 716 can also be formatted in a computer-readable format such as, but not limited to, binary values, ASCII or Unicode. Moreover, the data 716 can include information sufficient to identify relevant information, such as numbers, descriptive text, proprietary codes, pointers, references to data stored in other memories, including other network locations, or information that is used by a function to calculate relevant data.

The client computing device 704 can also be configured similarly to the server computing device 702, with one or more processors 720, memory 722, instructions 724, and data 726. The client computing device 704 can also include a user input 728, and a user output 730. The user input 728 can include any appropriate mechanism or technique for receiving input from a user, such as keyboard, mouse, mechanical actuators, soft actuators, touchscreens, microphones, and sensors.

The server computing device 702 can be configured to transmit data to the client computing device 704, and the client computing device 704 can be configured to display at least a portion of the received data on a display implemented as part of the user output 730. The user output 730 can also be used for displaying an interface between the client computing device 704 and the server computing device 702. The user output 730 can alternatively or additionally include one or more speakers, transducers or other audio outputs, a haptic interface or other tactile feedback that provides non-visual and non-audible information to the platform user of the client computing device 704.

Although FIG. 7 illustrates the processors 710, 720 and the memories 712, 722 as being within the computing devices 702, 704, components described herein can include multiple processors and memories that can operate in different physical locations and not within the same computing device. For example, some of the instructions 714, 724 and the data 716, 726 can be stored on a removable SD card and others within a read-only computer chip. Some or all of the instructions and data can be stored in a location physically remote from, yet still accessible by, the processors 710, 720. Similarly, the processors 710, 720 can include a collection of processors that can perform concurrent and/or sequential operation. The computing devices 702, 704 can each include one or more internal clocks providing timing information, which can be used for time measurement for operations and programs run by the computing devices 702, 704.

The server computing device 702 can be connected over the network 708 to a datacenter 732 housing any number of hardware accelerators 732A-N. The datacenter 732 can be one of multiple datacenters or other facilities in which various types of computing devices, such as hardware accelerators, are located. Computing resources housed in the datacenter 732 can be specified for deploying machine learning model architectures on hardware architectures, as described herein.

The server computing device 702 can be configured to receive requests to process data from the client computing device 704 on computing resources in the datacenter 732. For example, the environment 700 can be part of a computing platform configured to provide a variety of services to users, through various user interfaces and/or application programming interfaces (APIs) exposing the platform services. One or more services can be a machine learning framework or a set of tools for generating neural networks or other machine learning models according to a specified task and training data, such as chip placement as described herein. The client computing device 704 can receive and transmit data specifying target computing resources to be allocated for executing a neural network trained to perform a particular neural network task. The chip placement generation system 718 can receive the data specifying the target computing resources and/or training data, and in response, generate one or more machine learning model architectures and hardware architectures for deploying on the target computing resources, according to aspects of the disclosure described herein.

As other examples of potential services provided by a platform implementing the environment 700, the server computing device 702 can maintain a variety of model architectures in accordance with different potential target computing resources available at the datacenter 732. For example, the server computing device 702 can maintain different families for deploying neural networks on the various types of TPUs and/or GPUs housed in the datacenter 732 or otherwise available for processing.

The devices 702, 704 and the datacenter 732 can be capable of direct and indirect communication over the network 708. For example, using a network socket, the client computing device 704 can connect to a service operating in the datacenter 732 through an Internet protocol. The devices 702, 704 can set up listening sockets that may accept an initiating connection for sending and receiving information. The network 708 itself can include various configurations and protocols including the Internet, World Wide Web, intranets, virtual private networks, wide area networks, local networks, and private networks using communication protocols proprietary to one or more companies. The network 708 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network 708, in addition or alternatively, can also support wired connections between the devices 702, 704 and the datacenter 732, including over various types of Ethernet connection.

Although a single server computing device 702, client computing device 704, and datacenter 732 are shown in FIG. 7, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing neural networks, and any combination thereof.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for automatically performing floor planning in a chip, the method comprising:
  receiving, with one or more processors, data describing a plurality of nodes and connectivity among the plurality of nodes on a surface of the chip, the plurality of nodes comprising one or more blocks of integrated circuit components;
  identifying, with the one or more processors, a first alignment parameter for positioning the nodes on the surface of the chip based on the data;
  determining, with the one or more processors, a first reward based on the first alignment parameter;
  identifying, with the one or more processors, a second alignment parameter for positioning the nodes on the surface of the chip based on the first reward;
  determining, with the one or more processors, a second reward based on the second alignment parameter;
  selecting, with the one or more processors, a positioning of the nodes on the surface of the chip based on the second reward; and
  generating, with the one or more processors, a floor plan for the chip based on the selection.

2. The method of claim 1, further comprising iteratively identifying, with the one or more processors, additional alignment parameters for positioning the nodes on the surface of the chip based on a determined reward from a previous iteration.

3. The method of claim 2, further comprising iteratively determining, with the one or more processors, additional rewards based on the additional alignment parameters.

4. The method of claim 3, further comprising stopping, with the one or more processors, the iterative identifying and determining when the determined rewards approach a convergence or after a predetermined period of time.

5. The method of claim 1, further comprising identifying, with the one or more processors, a density parameter and a congestion parameter for positioning the nodes on the surface of the chip.

6. The method of claim 5, wherein the first reward is determined further based on the density parameter and congestion parameter.

7. The method of claim 1, wherein the determined first and second rewards are determined by a reward function that includes an alignment-based regularization cost.

8. The method of claim 7, wherein the alignment-based regularization cost is based on a reverse of a sum of all contiguous areas for the nodes normalized by the number of nodes in the plurality of nodes.

9. The method of claim 1, wherein the second alignment parameter is identified to increase a likelihood that the second reward is greater than the first reward.

10. A system comprising:
  one or more processors; and
  one or more storage devices coupled to the one or more processors and storing instructions that, when executed by the one or more processors, causes the one or more processors to perform operations for automatically performing floor planning in a chip, the operations comprising:
    receiving data describing a plurality of nodes and connectivity among the plurality of nodes on a surface of the chip, the plurality of nodes comprising one or more blocks of integrated circuit components;
    identifying a first alignment parameter for positioning the nodes on the surface of the chip based on the data;
    determining a first reward based on the first alignment parameter;
    identifying a second alignment parameter for positioning the nodes on the surface of the chip based on the first reward;
    determining a second reward based on the second alignment parameter;
    selecting a positioning of the nodes on the surface of the chip based on the second reward; and
    generating a floor plan for the chip based on the selection.

11. The system of claim 10, wherein the operations further comprise:
  iteratively identifying additional alignment parameters for positioning the nodes on the surface of the chip based on a determined reward from a previous iteration;
  iteratively determining additional rewards based on the additional alignment parameters; and
  stopping the iterative identifying and determining when the determined rewards approach a convergence or after a predetermined period of time.

12. The system of claim 10, wherein the operations further comprise identifying a density parameter and a congestion parameter for positioning the nodes on the surface of the chip, the first reward being determined further based on the density parameter and congestion parameter.

13. The system of claim 10, wherein the determined first and second rewards are determined by a reward function that includes an alignment-based regularization cost.

14. The system of claim 13, wherein the alignment-based regularization cost is based on a reverse of a sum of all contiguous areas for the nodes normalized by the number of nodes in the plurality of nodes.

15. The system of claim 10, wherein the second alignment parameter is identified to increase a likelihood that the second reward is greater than the first reward.

16. A non-transitory computer readable medium for storing instructions that, when executed by one or more processors, causes the one or more processors to perform operations for automatically performing floor planning in a chip, the operations comprising:
receiving data describing a plurality of nodes and connectivity among the plurality of nodes on a surface of the chip, the plurality of nodes comprising one or more blocks of integrated circuit components;
identifying a first alignment parameter for positioning the nodes on the surface of the chip based on the data;
determining a first reward based on the first alignment parameter;
identifying a second alignment parameter for positioning the nodes on the surface of the chip based on the first reward;
determining a second reward based on the second alignment parameter;
selecting a positioning of the nodes on the surface of the chip based on the second reward; and
generating a floor plan for the chip based on the selection.

17. The non-transitory computer readable medium of claim 16, wherein the operations further comprise:
iteratively identifying additional alignment parameters for positioning the nodes on the surface of the chip based on a determined reward from a previous iteration;
iteratively determining additional rewards based on the additional alignment parameters; and
stopping the iterative identifying and determining when the determined rewards approach a convergence or after a predetermined period of time.

18. The non-transitory computer readable medium of claim 16, wherein the operations further comprise identifying a density parameter and a congestion parameter for positioning the nodes on the surface of the chip, the first reward being determined further based on the density parameter and congestion parameter.

19. The non-transitory computer readable medium of claim 16, wherein the determined first and second rewards are determined by a reward function that includes an alignment-based regularization cost, the alignment-based regularization cost being based on a reverse of a sum of all contiguous areas for the nodes normalized by the number of nodes in the plurality of nodes.

20. The non-transitory computer readable medium of claim 16, wherein the second alignment parameter is identified to increase a likelihood that the second reward is greater than the first reward.

* * * * *